(12) United States Patent
Yin et al.

(10) Patent No.: US 9,076,363 B2
(45) Date of Patent: Jul. 7, 2015

(54) PARALLEL SENSING CONFIGURATION COVERS SPECTRUM AND COLORIMETRIC QUANTITIES WITH SPATIAL RESOLUTION

(71) Applicant: Apple Inc., Cupertino, CA (US)

(72) Inventors: Ye Yin, Sunnyvale, CA (US); Gabriel Marcu, San Jose, CA (US); Julia C. Davoud, San Francisco, CA (US)

(73) Assignees: Apple Inc., Cupertino, CA (US); Instrument Systems Optische Messtechnik GmbH, Munich (DE)

( * ) Notice: Subject to any disclaimer, the term of this patent is extended or adjusted under 35 U.S.C. 154(b) by 145 days.

(21) Appl. No.: 13/736,008

(22) Filed: Jan. 7, 2013

(65) Prior Publication Data

US 2014/0192209 A1    Jul. 10, 2014

(51) Int. Cl.
*G01N 21/00* (2006.01)
*G09G 3/00* (2006.01)
*G02F 1/13* (2006.01)
*G01J 3/02* (2006.01)

(52) U.S. Cl.
CPC ........... *G09G 3/006* (2013.01); *G02F 1/13* (2013.01); *G01J 3/02* (2013.01)

(58) Field of Classification Search
None
See application file for complete search history.

(56) References Cited

U.S. PATENT DOCUMENTS

| | | | |
|---|---|---|---|
| 5,608,526 A | 3/1997 | Piwonka-Corle et al. | |
| 6,583,879 B1 * | 6/2003 | Berg et al. | 356/402 |
| 7,369,239 B2 | 5/2008 | Nagashima et al. | |
| 7,626,688 B2 | 12/2009 | Ou et al. | |
| 7,710,560 B2 * | 5/2010 | Holub | 356/300 |
| 2002/0180956 A1 * | 12/2002 | Barker | 356/121 |
| 2003/0117620 A1 * | 6/2003 | Balas et al. | 356/326 |
| 2003/0193034 A1 * | 10/2003 | Tullis et al. | 250/559.16 |
| 2005/0052643 A1 * | 3/2005 | Lange et al. | 356/237.1 |
| 2005/0200847 A1 * | 9/2005 | Chen et al. | 356/419 |
| 2006/0028156 A1 * | 2/2006 | Jungwirth | 315/312 |
| 2006/0146178 A1 * | 7/2006 | Ishiga | 348/363 |
| 2007/0121110 A1 * | 5/2007 | Kralik et al. | 356/318 |
| 2008/0266563 A1 * | 10/2008 | Redman et al. | 356/406 |
| 2009/0091754 A1 * | 4/2009 | Zhang | 356/326 |
| 2009/0168182 A1 * | 7/2009 | Chang et al. | 359/589 |
| 2010/0148083 A1 * | 6/2010 | Brown et al. | 250/372 |
| 2010/0195111 A1 * | 8/2010 | Farsaie et al. | 356/456 |
| 2010/0245650 A1 * | 9/2010 | Kreysar et al. | 348/311 |
| 2012/0206725 A1 * | 8/2012 | Vukovic-Cvijin et al. | 356/402 |

* cited by examiner

*Primary Examiner* — Kara E Geisel
*Assistant Examiner* — Hina F Ayub
(74) *Attorney, Agent, or Firm* — Raymond R. Ferrera; Adams and Reese, LLP

(57) ABSTRACT

An optical test equipment/method for display testing that features parallel testing/sensing configuration that covers spectrum and colorimetric quantities with spatial resolution is disclosed. In one embodiment, a spectra-camera, which is a hybrid system consisting of both a single-point spectrometer and an imaging colorimeter, can be configured for concurrent display artifact and parametric testing. An aperture mirror with a hole in the middle splits an image of a test display into two parts. One part of the image passes through the hole and is directed to the spectrometer for display parametric testing. The rest of the image is reflected off the aperture mirror for concurrent display artifact testing with the colorimeter. In another embodiment, a beam splitter can be used instead of an aperture mirror. In yet another embodiment, the single-point high accuracy spectrometer can be used to calibrate the low accuracy imaging colorimeter.

20 Claims, 12 Drawing Sheets

Crossed Czerny-Turner spectrometer

*Figure 1A*

Lens-Grating-Lens spectrometer

Mirror-Grating-Mirror spectrometer

Captured image of a line defect
found on a test display

PARALLEL SENSING CONFIGURATION COVERS SPECTRUM AND COLORIMETRIC QUANTITIES WITH SPATIAL RESOLUTION

FIELD OF THE DESCRIBED EMBODIMENTS

The described embodiments relate generally to an optical test equipment/method for display testing and more particularly to an optical test equipment/method for display testing that features parallel testing/sensing configuration that covers spectrum and colorimetric quantities with spatial resolution.

BACKGROUND

Current optical test equipment for display testing is either a single-point high accuracy system or a low accuracy imaging system covering a large spatial area. These two types of systems target on different testing objectives. The single-point system will test the display parametric data, including the brightness, color and derived properties, such as contrast, uniformity, gamma and gamut. But the testing only focuses on a single point and not a large spatial area. The imaging system, on the other hand, will test for display artifacts by covering a large spatial area, but it will not have the high accuracy of a single-point system.

A single-point high accuracy system is also known as a narrowband instrument. Spectrometer (or spectrophotometers) and spectroradiometers are examples of narrowband instruments. These instruments typically record spectral reflectance and radiance respectively within the visible spectrum in increments ranging from 1 to 10 nm, resulting in 30-200 channels. They also have the ability to internally calculate and report tristimulus coordinates from the narrowband spectral data. Spectroradiometers can measure both emissive and reflective stimuli, while spectrometers can measure only reflective stimuli. A low accuracy imaging system covering a large spatial area is also known as a broadband instrument. A broadband measurement instrument reports up to 3 color signals obtained by optically processing the input light through broadband filters. Photometers are the simplest example, providing a measurement only of the luminance of a stimulus. Their primary use is in determining the nonlinear calibration function of displays. Densitometers are an example of broadband instruments that measure optical density of light filtered through red, green and blue filters. Colorimeters are another example of broadband instruments that directly report tristimulus (XYZ) values, and their derivatives such as CIELAB (i.e., CIE 1976 (L*, a*, b*) color space). Under the narrowband category fall instruments that report spectral data of dimensionality significantly larger than three.

The main advantage of broadband instruments such as densitometers and colorimeters is that they are relatively inexpensive and can read out data at very fast rates. However, the resulting measurement is only an approximation of the true tristimulus signal, and the quality of this approximation varies widely depending on the nature of the stimulus being measured. Accurate colorimetric measurement of arbitrary stimuli under arbitrary illumination and viewing conditions requires spectral measurements afforded by the more expensive narrowband instruments. Compared with measuring instruments without spatial resolutions, such as spectrometers, this technology offers the following advantages: (a) Substantial time-savings with simultaneous capture of a large number of measurements in a single image, and (b) Image-processing functions integrated in the software allow automated methods of analysis, e.g. calculation of homogeneity or contrast. However, the absolute measuring precision of imaging photometers and colorimeters is not as high as spectrometers. This is because of the operational principle using a CCD (charge-coupled device) sensor in combination with optical filters, which can only be adapted to the sensitivity of the human eye with limited precision. Therefore, the imaging colorimeters are the instruments of choice for measurement of luminance and color distribution of panel graphics and control elements in the display test industry, including but not limited to homogeneity, contrast, mura (i.e., luminance non-uniformity of a display device) and MTF (Modulation Transfer Function).

Therefore, what is desired is an optical test equipment/method for display testing that can perform the functionalities of both the single-point high accuracy system and the low accuracy imaging system at the same time (i.e., parallel testing/sensing configuration that covers spectrum and colorimetric quantities with spatial resolution).

SUMMARY OF THE DESCRIBED EMBODIMENTS

This specification describes various embodiments that relate to an optical test equipment/method for display testing that can perform the functionalities of both a single-point high accuracy system and a low accuracy imaging system at the same time (i.e., parallel testing/sensing configuration that covers spectrum and colorimetric quantities with spatial resolution). In one embodiment, a spectra-camera, which is a hybrid system consisting of both a single-point high accuracy system and a low accuracy imaging system, can be used for this parallel testing. In one embodiment, the single-point high accuracy system can be a spectrometer, while the low accuracy imaging system can be a colorimeter. An aperture mirror can then be used to split an image of a display to be tested into two parts. One part of the image passes through a hole in the aperture mirror and is directed to a single-point high accuracy system for parametric testing. The rest of the image is reflected off the aperture mirror for simultaneous display artifact testing with a low accuracy imaging system with spatial resolution. In another embodiment, a beam splitter, instead of an aperture mirror, can be used to split the display image for simultaneous testing with both a single-point high accuracy system and a low accuracy imaging system. In one embodiment, the single-point high accuracy system can be used to calibrate the low accuracy imaging system.

In one embodiment, a method for performing concurrent display artifact and parametric testing is disclosed. The method includes splitting an image of a display into a first image and a second image, sending the first image for display artifact testing, and sending, concurrently with the first image, the second image for display parametric testing. In one embodiment, the display artifact testing is performed concurrently with the display parametric testing. In one embodiment, a mirror with a hole in the middle is used to split an image of a display into a first image and a second image. Light reflecting off the mirror with the hole in the middle forms the first image and light passing through the hole forms the second image. In one embodiment, a beam splitter is used to split an image of a display into a first image and a second image. The beam splitter splits the image of the display such that the first image is substantially identical to the second image. In one embodiment, results of the display parametric testing for the second image can be used to calibrate results of the display artifact testing for the first image.

In one embodiment, a display testing system configured to perform concurrent display artifact and parametric testing is disclosed. The display testing system includes a splitter configured to split an image of a display into a first image and a second image, a display artifact tester configured to perform display artifact testing of the first image, a first image pipeline configured to direct the first image to the display artifact tester, a display parametric tester configured to perform display parametric testing of the second image, and a second image pipeline configured to direct the second image to the display parametric tester. In one embodiment, the splitter is an aperture mirror with a hole in the middle such that light reflecting off the aperture mirror forms the first image and light passing through the hole forms the second image. In one embodiment, the splitter is a beam splitter. In one embodiment, the display parametric tester is a spectrometer. In one embodiment, the display artifact tester is an imaging colorimeter. In one embodiment, the spectrometer is used to calibrate the imaging colorimeter.

In one embodiment, a computer program product encoded in a non-transitory computer readable medium for performing concurrent display artifact and parametric testing is disclosed. An image of a display is split into a first image and a second image. The first image is sent to an imaging colorimeter for display artifact testing and the second image is sent to a spectrometer for display parametric testing. The computer program product includes at least the following computer code: (1) computer code for display artifact testing, and (2) computer code for display parametric testing. In one embodiment, the computer program product further includes computer code for using results of the display parametric testing for the second image to calibrate results of the display artifact testing for the first image. In one embodiment, the computer program code for using results of the display parametric testing for the second image to calibrate results of the display artifact testing for the first image includes computer code for using tristimulus values of the spectrometer to calibrate tristimulus values of the imaging colorimeter. In one embodiment, the computer code for using tristimulus values of the spectrometer to calibrate tristimulus values of the imaging colorimeter includes computer code for recalibration of the imaging colorimeter if the tristimulus values of the imaging colorimeter is not within a tolerance specification of the tristimulus values of the spectrometer.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Figure 1A:
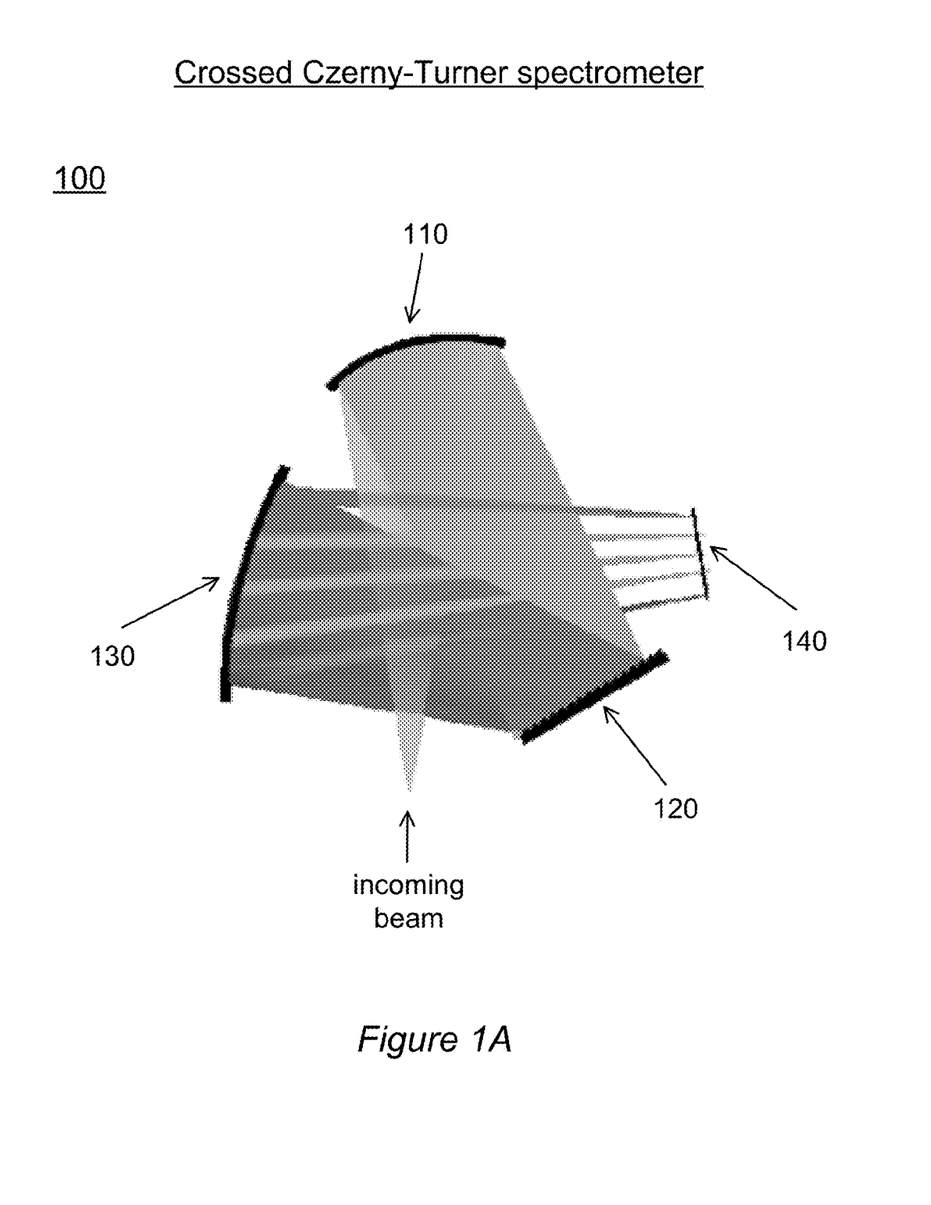
FIGS. 1A-1C illustrate the three basic types of spectrometer configurations that can be used for parallel testing configuration: (1A) Crossed Czerny-Turner, (1B) Lens-Grating-Lens, and (1C) Mirror-Grating-Mirror.
Figure 1B:
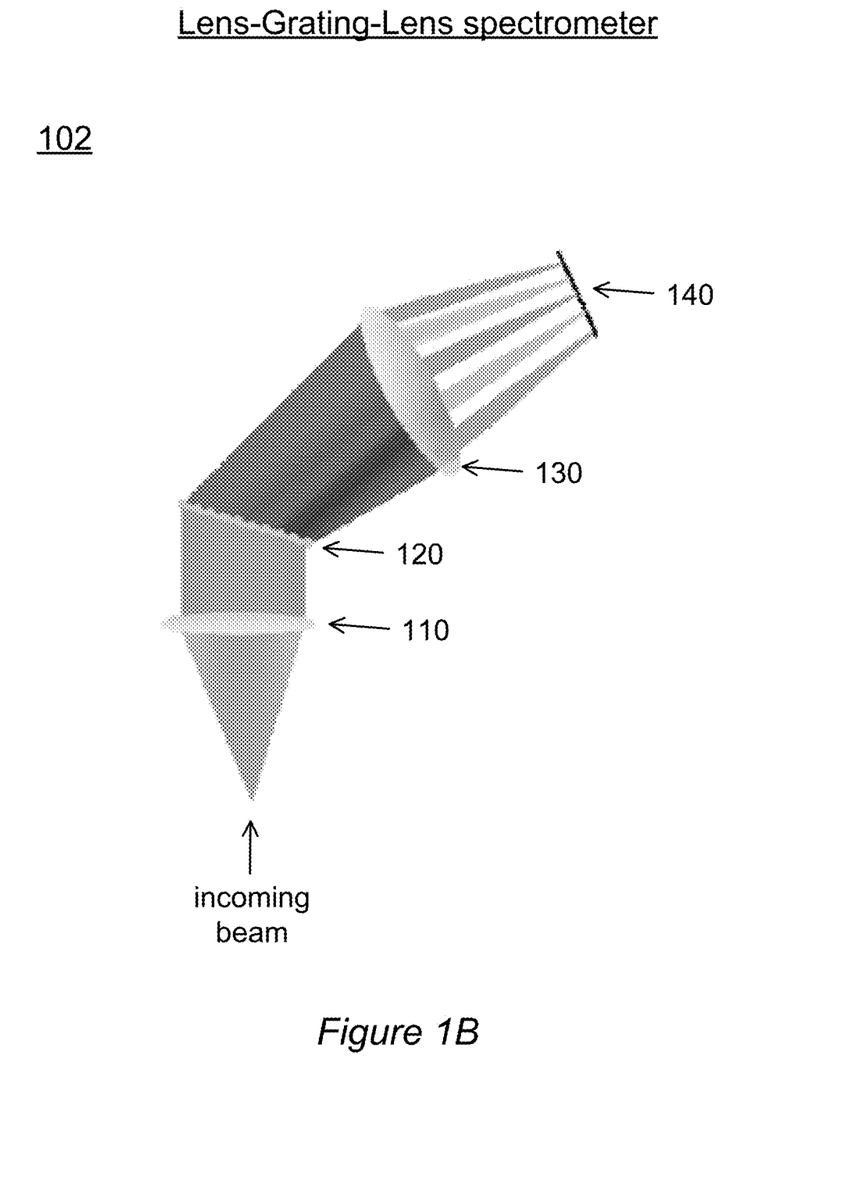
Figure 1C:
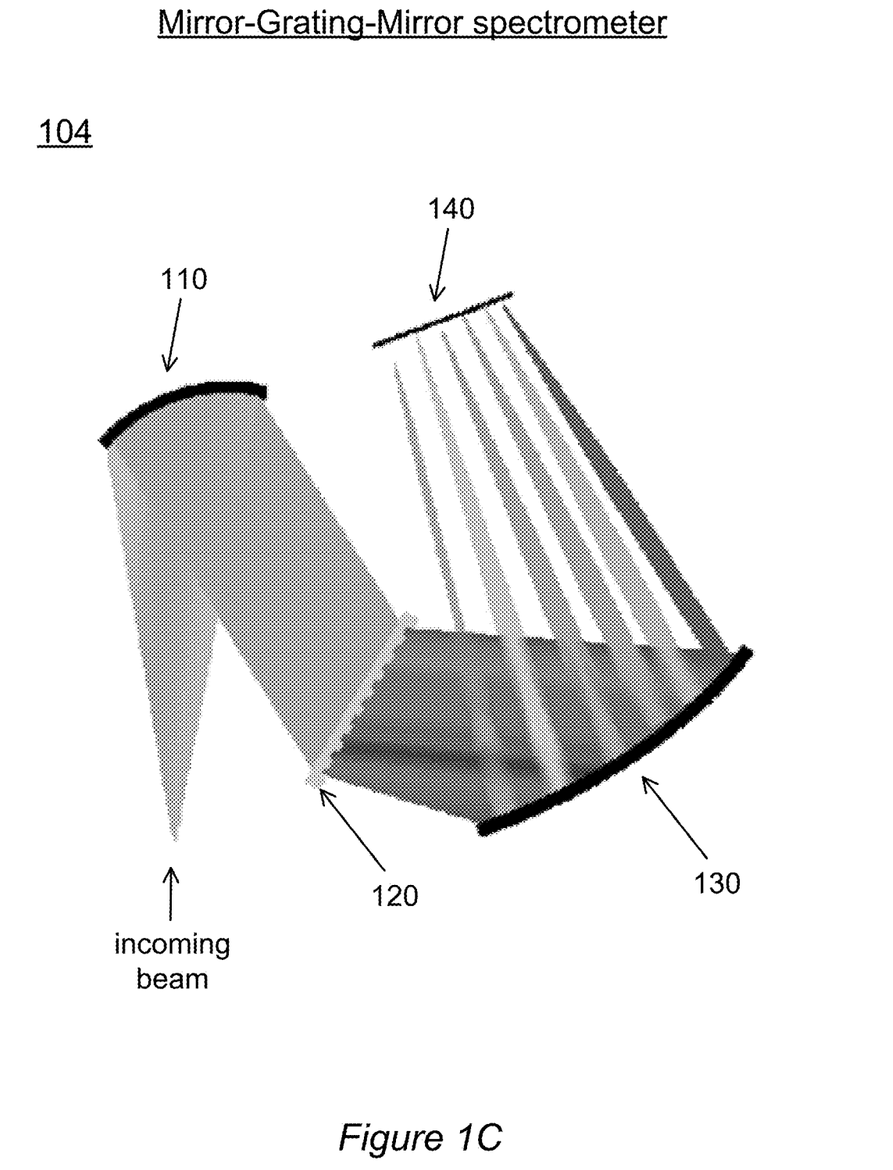

Spectrometer is a narrowband device which can quantify and measure the spectrum. FIGS. 1A-1C illustrate the three basic types of spectrometer configurations that are widely used and that can be used for parallel testing configuration with a spectra-camera. They are the Crossed Czerny-Turner (FIG. 1A), Lens-Grating-Lens (FIG. 1B), and Mirror-Grating-Mirror (FIG. 1C) configurations.

As FIGS. 1A-1C demonstrate, all spectrometers have these four key elements: (1) collimator 110, (2) diffractive grating 120, (3) focusing element 130, and (4) detector array 140. The beam will be first collimated at a curved mirror or lens 110. As the name indicates, the function of a collimator 110 is to collimate the beams in a controlled manner. The collimated beam is then diffracted by a grating 120. The diffraction grating 120 causes the collimated beam to diverge in angle space with different wavelength outputs. After the grating 120 diffracts the beam, different wavelength output beams will propagate in different direction. To make sure that these outputs beams hit the right detectors, there is usually a focusing mirror or lens 130 positioned to ensure that all the output beams passing through the focusing mirror or lens 130 will focus on the right detector. The output beams with different wavelength will then be detected and absorbed by a detector array 140.

For transmission grating based spectrometer, the Crossed Czerny-Turner spectrometer uses all curved mirrors to realize the collimation and focusing function. The Lens-Grating-Lens (LGL) spectrometer uses two lenses and a grating, while the Mirror-Grating-Mirror (MGM) spectrometer also uses two curved mirrors and a grating. FIG. 1A shows Crossed Czerny-Turner spectrometer 100, which uses curved mirrors for collimator 110 and focusing element 130. FIG. 1B shows Lens-Grating-Lens (LGL) spectrometer 102, which uses lenses for collimator 110 and focusing element 130, while FIG. 1C shows Mirror-Grating-Mirror (MGM) spectrometer 104, which also uses curved mirrors for collimator 110 and focusing element 130.

Spectrometers can be used for basic display parametric testing. As the name indicates, the display basic parameters usually refer to test items which do not involve the use of imaging algorithms, such as display white luminance, contrast, uniformity, gamma, color gamut, etc. The definition of these test items can be found in these four popular standards:
(1) VESA FPDM ('Video Electronics Standards Association' 'Flat Panel Display Measurements' standard),
(2) ISO 13406-2 (International Organization for Standardization 13406-2: "Ergonomic requirements for work with visual displays based on flat panels—Part 2: Ergonomic requirements for flat panel displays"),
(3) TCO '05 (Tjänstemännens Centralorganisation '05), and
(4) SPWG 3.5 (Standard Panels Working Group standard 3.5).

These standards are slightly different from each other due to historical reasons and because they target different panel sizes.

Figure 2A:
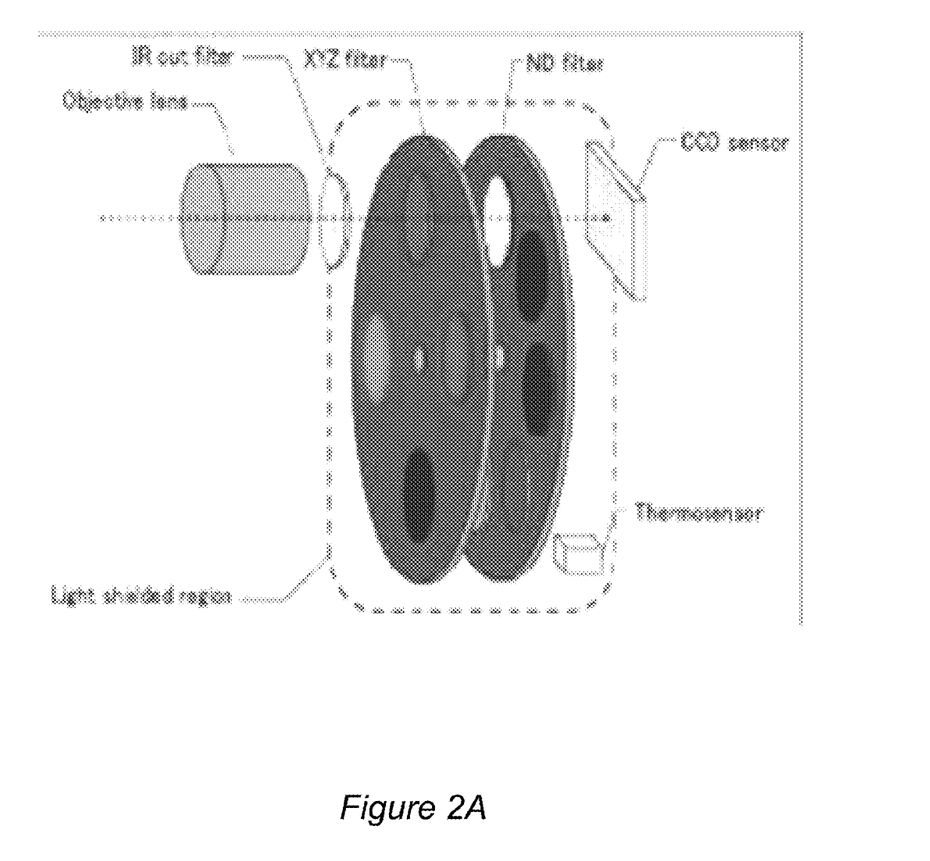
FIGS. 2A-2B illustrate the two basic types of color filters for a colorimeter that can be used for parallel testing configuration: (2A) time-sequential filter and (2B) Bayer filter.
Figure 2B:
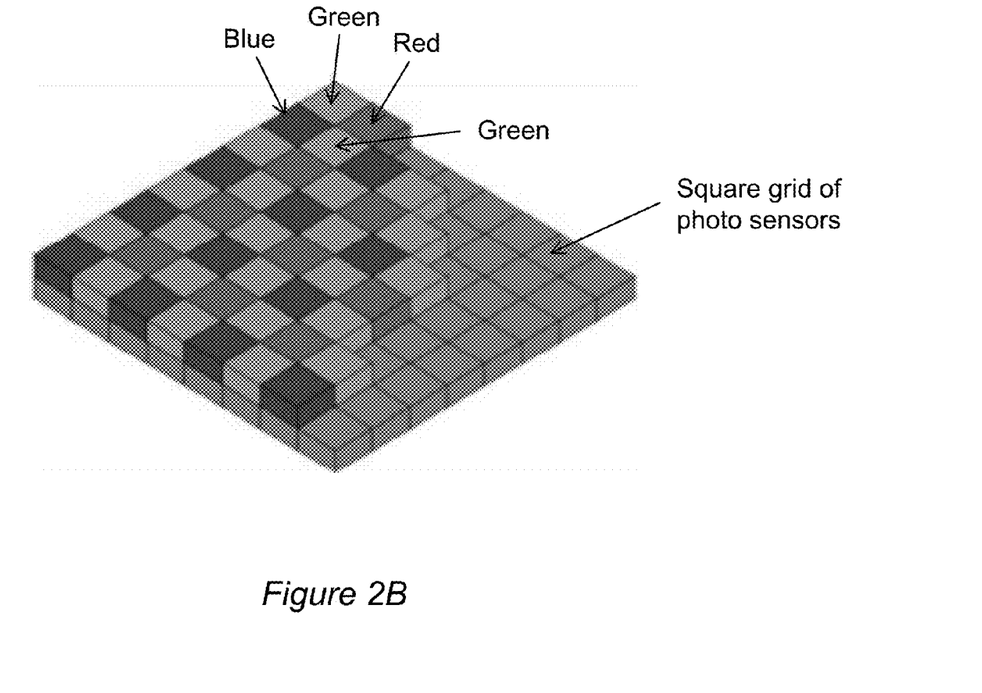

Imaging colorimeter, sometimes also called as imaging photometer, is an imaging device which behaves like a camera. The imaging colorimeter can be a time-sequential type or Bayer filter type. The time-sequential type colorimeter separates the measurement objective color in a time sequential manner by using a spinning color wheel, which is shown in FIG. 2A. At any particular moment, the measurement objective photons with only a certain color will be transmitting through the filter and hitting the embedded CCD or CMOS imager inside the colorimeter. The overall display color information and imaging can be reconstructed after at least one cycle of the color wheel spinning A second type of imaging colorimeter separates the color channels by Bayer filters, which are shown in FIG. 2B. A Bayer filter is a color filter array which is composed of periodically aligned 2×2 filter element. The 2×2 filter element is composed of two green filter elements, one red filter and one blue filter element. The Bayer filter sits on top of a square grid of photo sensors.

There are advantages and disadvantages to both types of colorimeters. The time-sequential colorimeter will be more precise, but also more time consuming. The Bayer filter colorimeter, on the other hand, has the one-shot capability to extract the color information with resolution loss. Additionally, there is also a third type of spatial Foveon filter which can separate the color by vertical stack photodiode layer. In the Foveon filter, the red, green, and blue (RGB) color sensitive pixels lie stacked on top of each other, in layers, instead of spread on a single layer as is found in the Bayer filter. Foveon filter can have the advantage that color artifacts normally associated with the Bayer filter are eliminated and light sensitivity is increased, but there are very few applications of the Bayer filter in cameras and none in off-the-shelf colorimeters.

Imaging colorimeter can be used for artifact testing, which is more complicated than basic display parametric testing and without clear boundary. The artifacts refer to the human perception of the display visual artifacts. The detected artifacts can be classified into two categories: (a) Static artifacts, where artifacts do not change over time; and (b) Dynamic artifact, where the artifacts are more visible during a certain time frame. Dynamic artifacts include flickering (i.e., luminance exhibits a frequency pattern which can cause human eye fatigue), ripper, and dynamic cross-talk. For both static and dynamic artifacts, depending on the viewing condition, they can be further classified as on-axis artifacts which are visible at normal view and off-axis artifacts which are visible at tilt angle view.

The use of imaging colorimeters for fast capture of photometric and colorimetric quantities with spatial resolution is very attractive. Compared with measuring instruments without spatial resolutions, such as spectrometers, imaging colorimeters offer the advantage of substantial time savings since a single image can simultaneously capture a large number of measurements. Imaging colorimeters also offer the advantage of being able to perform automated methods of analysis, such as calculation of homogeneity or contrast, because of image processing functions integrated in the imaging software. Additionally, imaging colorimeters are relatively inexpensive as compared to spectrometers.

However, the imaging colorimeters and photometers have a lower measuring precision than spectrometers. This is because imaging colorimeters operate using a CCD (charge-coupled device) sensor in combination with optical filters. For example, in the case of the Bayer filter, there are only three types of color filters (i.e., red, green, and blue), so there is lacking the precision found in spectrometers, where the visible spectrum can be partitioned by increments ranging from 1 to 10 nm, resulting in 30-200 channels. Therefore, in a spectra-camera used for display testing, the imaging colorimeters are best utilized for measurement of luminance and color distribution of panel graphics and control elements, including but not limited to homogeneity, contrast, mura (i.e., luminance non-uniformity of a display device) and MTF (Modulation Transfer Function).

Figure 3:
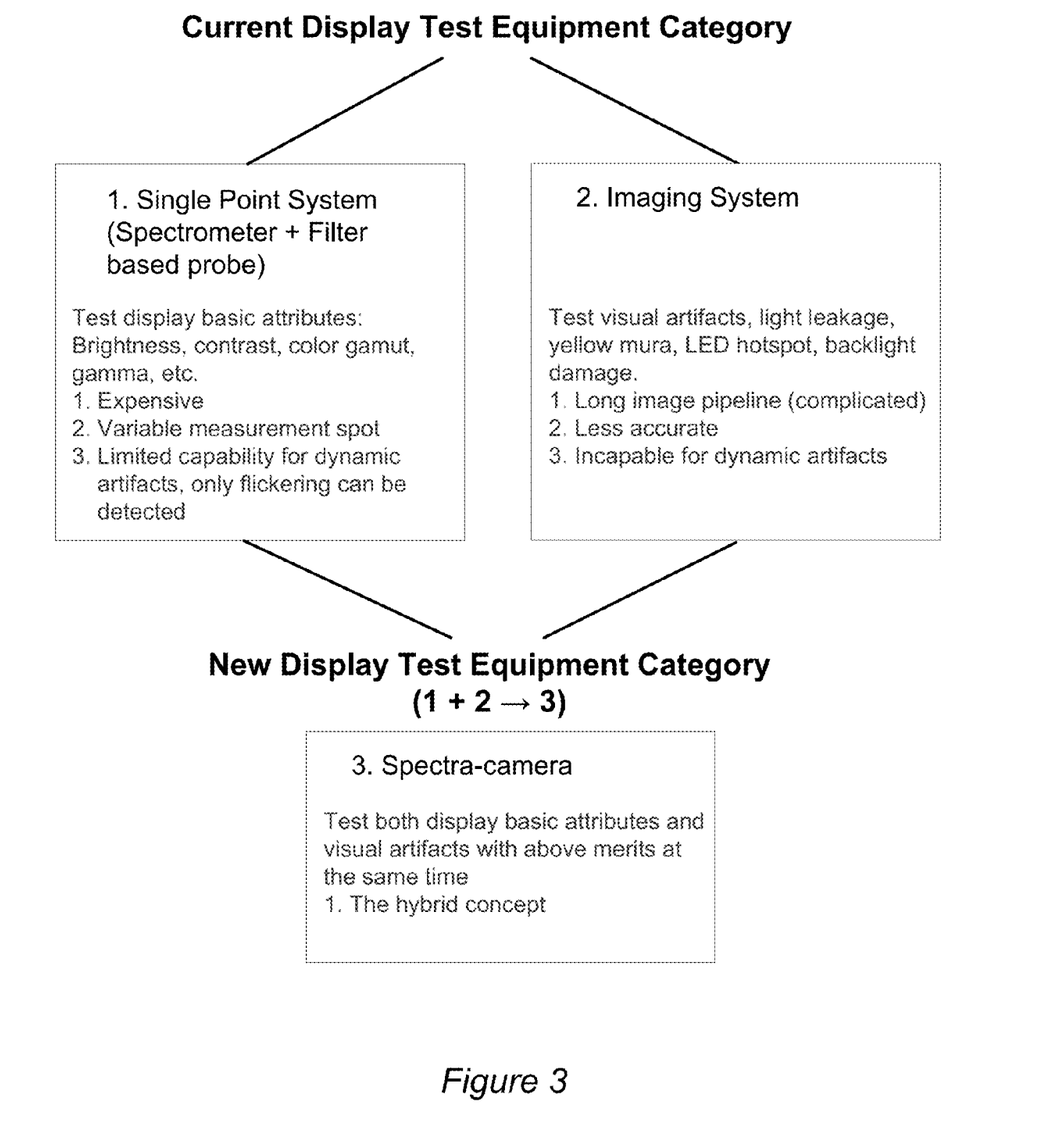
FIG. 3 illustrates a new display test equipment category (i.e., Spectra-camera), which can simultaneously incorporate the testing objectives of both current display test equipment categories (i.e., Single point system and Imaging system).

FIG. 3 illustrates a new display test equipment category (i.e., Spectra-camera), which can simultaneously incorporate the testing objectives of both current display test equipment categories (i.e., Single point system and Imaging system). The single point system is a high accuracy narrowband device measuring a single spot on a display, so there is little or no spatial resolution. Examples of a single point system include a spectrometer together with or without a filter based probe. A single point system can perform display parametric testing, which includes testing basic display attributes, such as brightness, contrast, color, gamut, gamma, etc. The single point system can have the following features: (1) expensive, (2) variable measurement spot, and (3) limited capability for dynamic artifacts, but only flickering can be detected. The imaging system, on the other hand, is a low accuracy broadband device measuring a large area on a display, so there is high spatial resolution. Examples of an imaging system include a time-sequential type or Bayer filter type imaging colorimeter. An imaging system can perform display artifact testing, which includes testing visual artifacts, light leakage, yellow mura, LED (light-emitting diode) hotspot, backlight damage, etc. The imaging system can have the following features: (1) long image pipeline (complicated), (2) less accurate than the single point system, and (3) incapable for dynamic artifacts.

Since both categories of test equipment have their advantages, what is desired is a new category of test equipment that can simultaneously incorporate the testing objectives of both the single point system and the imaging system. FIG. 3 indicates that this new category of display test equipment can be called "Spectra-camera". A spectra-camera is a hybrid test system, which can simultaneously perform the testing functions of both the single-point system and the imaging system. In one embodiment, a spectra-camera can be a hybrid test system consisting of both a single-point system and an imaging system. By splitting an image of a display to be tested into two parts, a spectra-camera can send the two parts to both systems at the same time for testing. For example, the part sent to the single-point system can be an image of a spot on the display, while the part sent to the imaging system can be an image of the entire display minus the spot.

Figure 4:
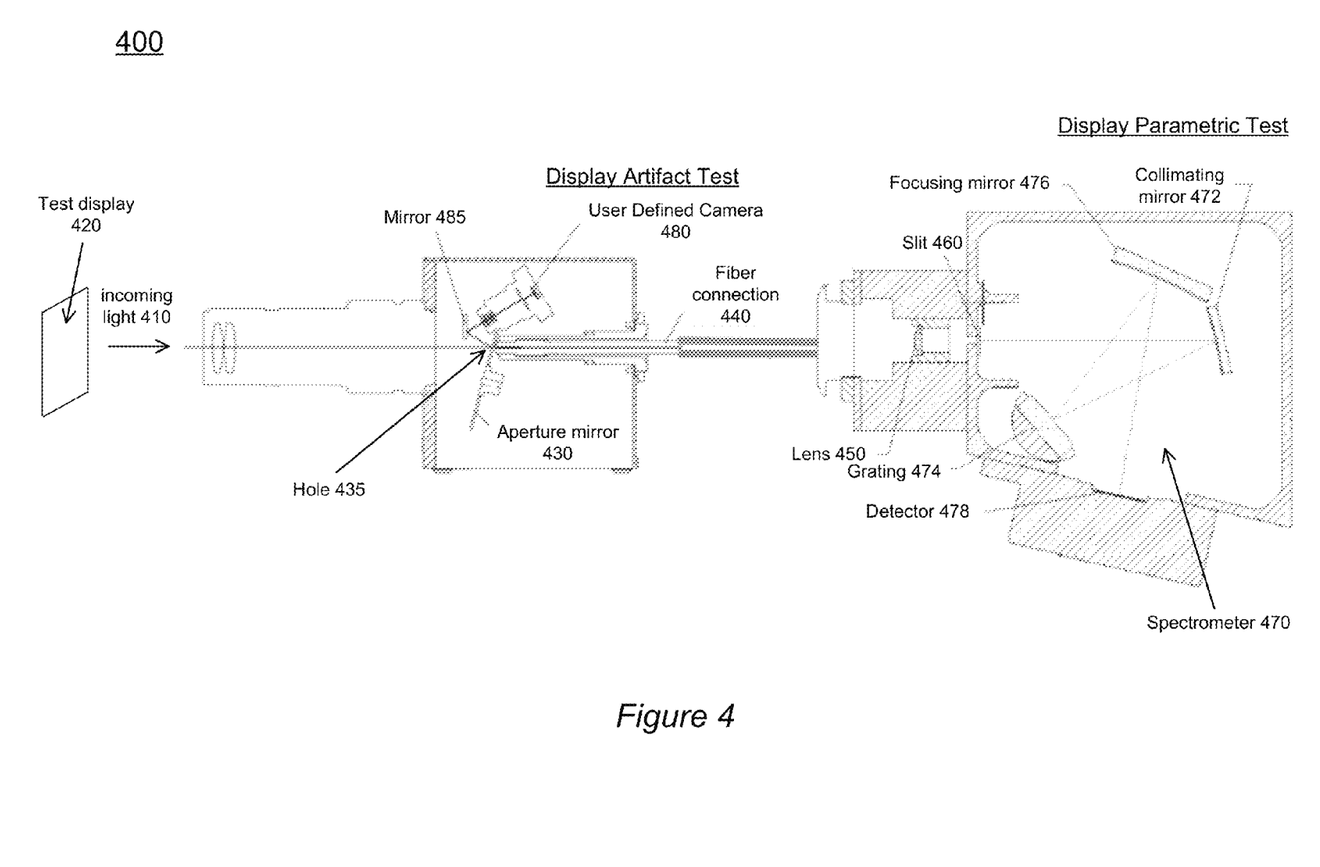
FIG. 4 illustrates an embodiment of a spectra-camera.

FIG. 4 illustrates an embodiment of a spectra-camera 400. Spectra-camera 400 can read the spectrum and form the image. Incoming light 410 from a display 420 to be tested enters a slit and hit an aperture mirror 430. A hole 435 in the aperture mirror 430 can enable some of the light to be sampled into a fiber connector 440. It is not shown, but in another embodiment a beam splitter, instead of an aperture mirror, can enable some of the light to be sampled into a fiber connector 440. The sample light can go through a lens 450 and a slit 460 to avoid stray light. The sample light beam eventually goes through a Crossed Czerny-Turner spectrometer 470 (with collimating mirror 472, grating 474, focusing mirror 476) and the diffracted output is collected by a detector array 478. In the mean time, aperture mirror can also reflect the rest of the light from the test display into a user defined camera 480. It is not shown, but in another embodiment a beam splitter, instead of an aperture mirror, can also reflect the rest of the light from the test display into a user defined camera 480. Camera 480 can form an image to be used for imaging analysis. In the embodiment shown in FIG. 4, mirror 485 can be used to direct the display image into camera 480. In another embodiment that is not shown, the display image can be sent directly into camera 480 without the use of mirror 485, if camera 480 is positioned differently to receive the display image. Spectra camera 400 has the advantage of a wide test coverage, since both display parametric testing and display artifact testing can be performed at the same time. Doing both tests at the same time reduces test time and boost display testing throughput.

In one embodiment, spectrometer 470 can be configured to perform display parametric testing. In one embodiment, spectrometer 470 can be a Crossed Czerny-Turner spectrometer. In another embodiment, spectrometer 470 can be a Lens-Grating-Lens (LGL) spectrometer or a Mirror-Grating-Mirror (MGM) spectrometer. In one embodiment, spectrometer 470 can be configured to be detachable from spectra-camera 400.

In one embodiment, user defined camera 480 can be configured to perform display artifact testing. In one embodiment, user defined camera 480 can be an imaging colorimeter. In an embodiment, the imaging colorimeter can be a time-sequential type or Bayer filter type. In another embodiment, the imaging colorimeter can be spatial Foveon filter type. In one embodiment, user defined camera 480 can be configured to be detachable from spectra-camera 400.

Figure 5:
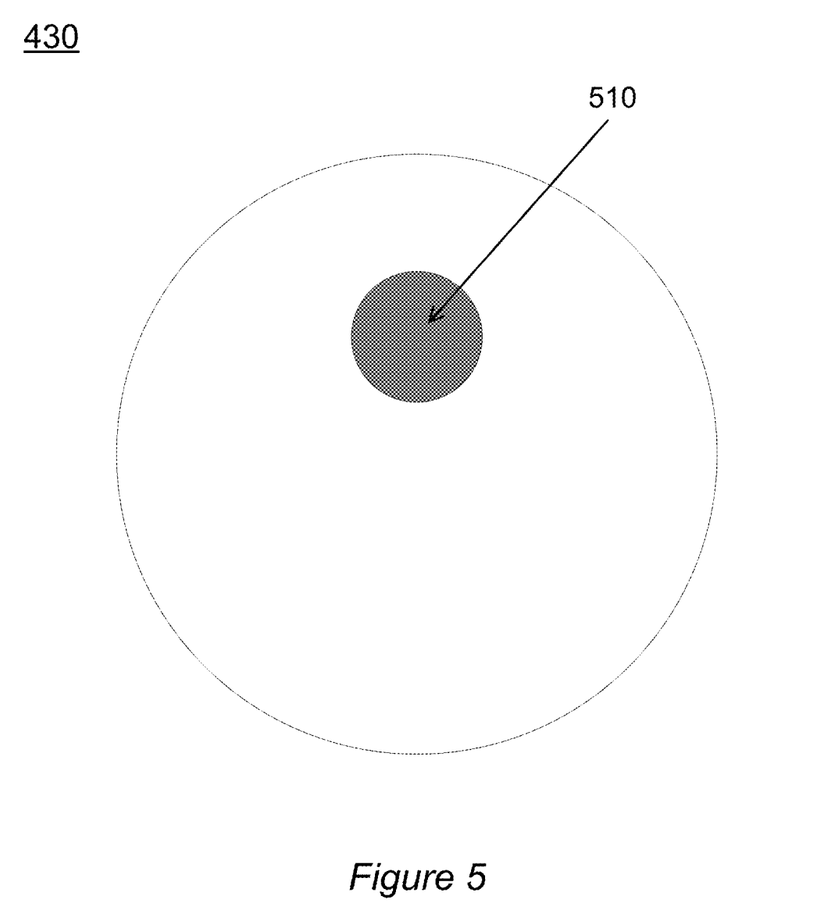
FIG. 5 illustrates an embodiment of an aperture mirror for a spectra-camera.

FIG. 5 illustrates an embodiment of aperture mirror 430 for spectra-camera 400 of FIG. 4. Here, a hole 510 in aperture mirror 430 allows some light from a test display 420 to be sampled by a spectrometer. In one embodiment, hole 510 can be positioned in the center of aperture mirror 430. In one embodiment, hole 510 can be positioned near the edge of aperture mirror 430. In one embodiment, aperture mirror can be configured so that hole 510 is sampling light from the center of the test display 420. In one embodiment, aperture mirror 430 can be configured so that hole 510 is sampling light from the edge of the test display 420. In one embodiment, aperture mirror 430 can have more than one hole. In one embodiment, aperture mirror 430 can have more than one hole and sample light from each hole is used for display parametric testing. In one embodiment, aperture mirror can have more than one hole and each hole is used to sample light from various predetermined positions on the test display for display parametric testing. In one embodiment, the various predetermined positions on the test display can include center, edge, top edge, bottom edge, left side edge, and right side edge of the test display. FIG. 5 displays hole 510 as a circle, but in other embodiments hole 510 can be of any shape or size in order to optimize the spectrometer measurement or to help facilitate testing of specific regions of the test display. For example, the shape of hole 510 can be elliptical, square or rectangular. Similarly, aperture mirror 430 can be of any shape or size in order to optimize the display artifact testing or to help facilitate testing of specific regions of the test display. For example, the shape of aperture mirror 430 can be elliptical, square or rectangular. In one embodiment, the shape of aperture mirror 430 can be rectangular in order to match the shape of test display 420.

Figure 6A:
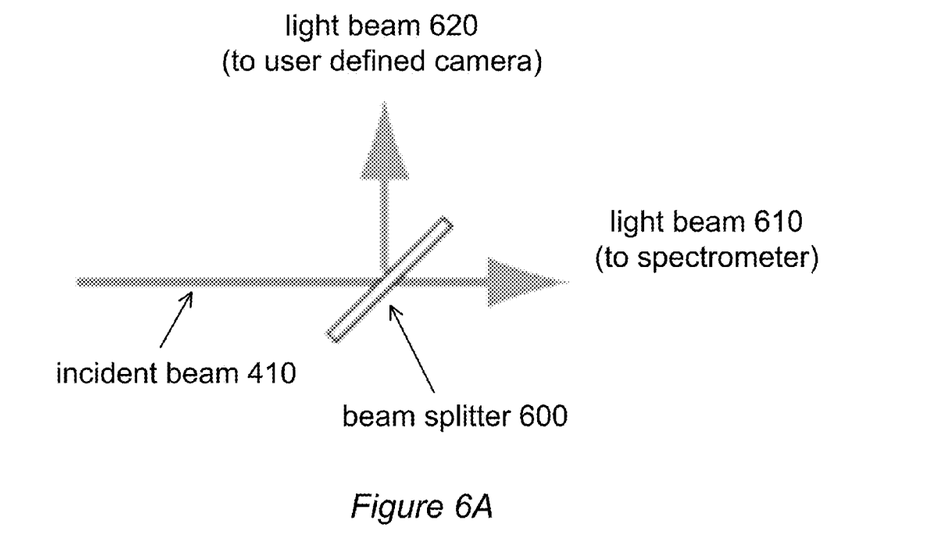
FIGS. 6A-6B illustrates two basic types of beam splitter that can be used for a spectra-camera: (6A) half-silvered mirror and (6B) cube.
Figure 6B:
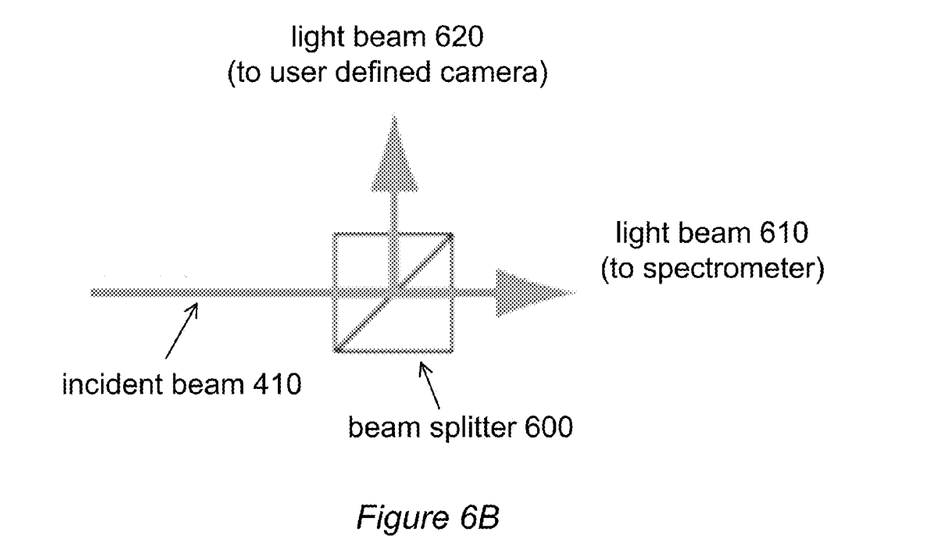

A beam splitter is an optical device that can split a beam of light into two. In one embodiment, instead of an aperture mirror, a spectra-camera can use a beam splitter to separate the light from the test display for simultaneously testing with a spectrometer and a user defined camera (i.e., simultaneous display parametric testing and display artifact testing). FIGS. 6A-6B illustrates two basic types of beam splitter that can be used for a spectra-camera: (6A) half-silvered mirror and (6B) cube. In FIG. 6A, beam splitter 600 is a half-silvered mirror that can split incident beam 410 into two beams: light beam 610 which is sent to a spectrometer and light beam 620 which is sent to a user defined camera. In FIG. 6B, beam splitter 600 is a cube that can split incident beam 410 into two beams: light beam 610 which is sent to a spectrometer and light beam 620 which is sent to a user defined camera.

Figure 7:
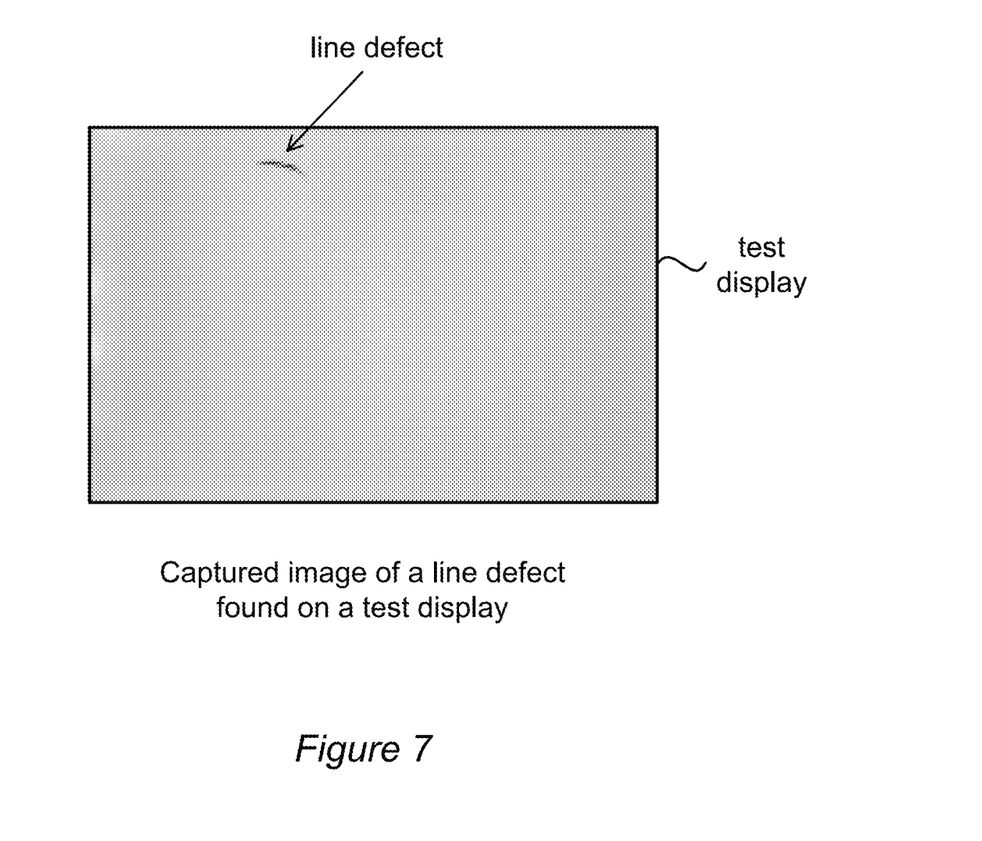
FIG. 7 illustrates a captured image of a line defect found on a test display.

In one embodiment, a spectra-camera can perform parallel testing, where display artifact testing can occur with the spectrometer on. The display artifact testing can detect various defective display symptoms, such as LED hotspot, dot defect, yellow mura, and line defect. Concurrently, the spectrometer can be used to perform display parametric testing, so that basic attributes, such as brightness, contrast, color gamut, gamma, etc., are measured. FIG. 7 illustrates a captured image of a line defect found on a test display. The line defect is a type of defective display symptom that can be detected and analyzed using a spectra-camera.

In one embodiment, a spectra-camera can perform self-calibration, where the high precision spectrometer can be used to calibrate the low precision imaging colorimeter. This can be accomplished by linking the high precision spectrometer to the low precision imaging colorimeter and performing the equipment self calibration triggered by the same standard illuminant. In one embodiment, the same standard illuminant is used to simultaneously calibrate the high precision spectrometer and the low precision imaging colorimeter in parallel. For the high precision spectrometer, the calibration process flow can include the following process steps:
  (1) Luminance Reference Normalization,
  (2) Spectral Radiance Normalization,
  (3) Photodiode Position Check,
  (4) Spectrum, and
  (5) Tristimulus values XYZ.

For the low precision imaging colorimeter, the parallel calibration process flow can include the following process steps:
  (1) ADC (analog-to-digital converter),
  (2) Bad Pixel Correction,
  (3) Gain/Offset Correction,
  (4) Flat Field Correction,
  (5) Luminance Correction,
  (6) Linearity Correction,
  (7) Focus Correction,
  (8) Chromaticity Correction, (9) Spatial Correction,
(10) Instrument Correlation Correction, and
(11) Tristimulus values XYZ.

The tristimulus values XYZ of the low precision imaging colorimeter is compared against the tristimulus values XYZ of the high precision spectrometer. If they are within a tolerance specification such as 0.0015 for XYZ, then the tolerance specification is met and the low precision imaging colorimeter is deemed to be calibrated. If the tolerance specification is not met, then the low precision imaging colorimeter needs to recalibrated by repeating the colorimeter calibration process from the Luminance Correction process step (i.e., step (5)). At the end of the colorimeter recalibration process, the tristimulus values XYZ of the colorimeter is again compared against the tristimulus values XYZ of the spectrometer. Calibration of the colorimeter is complete if the tolerance specification is met.

Figure 8:
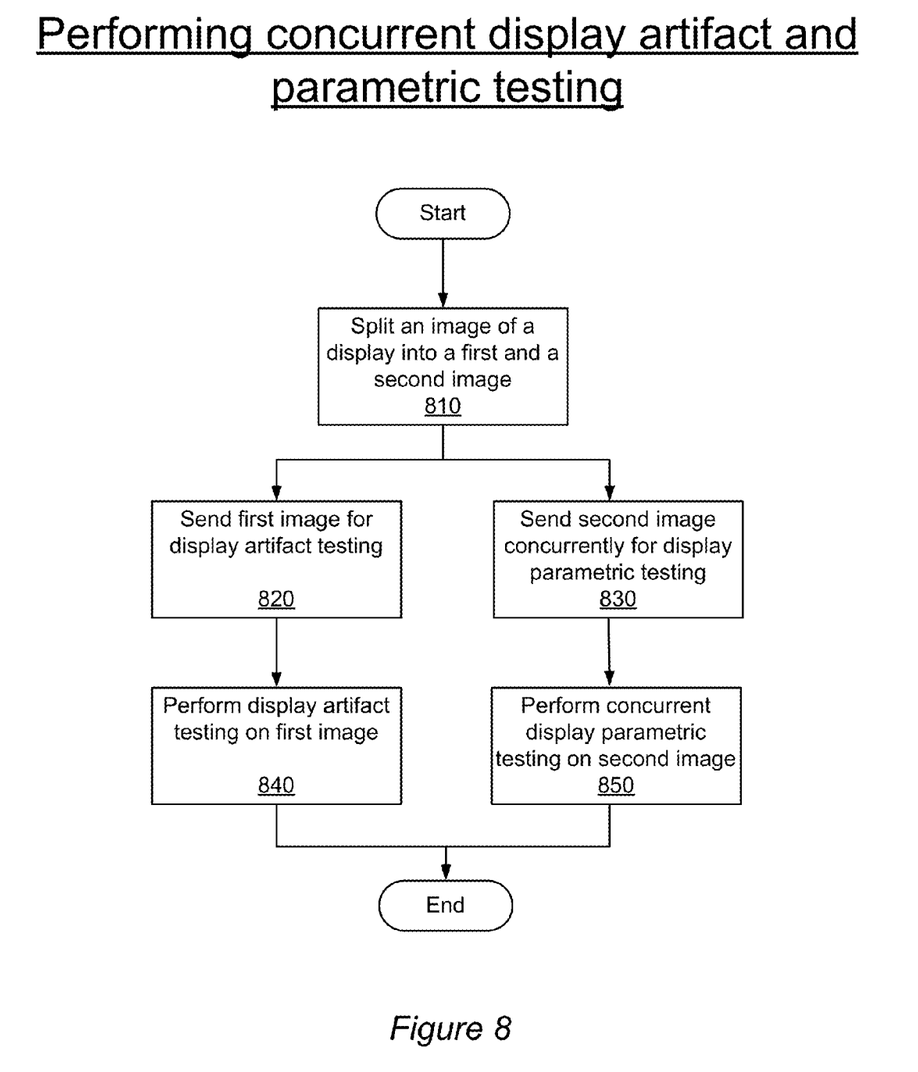
FIG. 8 illustrates a flow chart showing method steps for performing concurrent display artifact and parametric testing.

FIG. 8 illustrates a flow chart showing method steps for performing concurrent display artifact and parametric testing. In one embodiment, a method for performing concurrent display artifact and parametric testing starts with step 810, which splits an image of a display to be tested into a first image and a second image. The method continues in step 820 by sending the first image for display artifact testing. The method sends, concurrently with the first image, the second image for display parametric testing in step 830. Then the method performs display artifact testing on the first image (step 840) concurrently with the display parametric testing on the second image (step 850).

Figure 9:
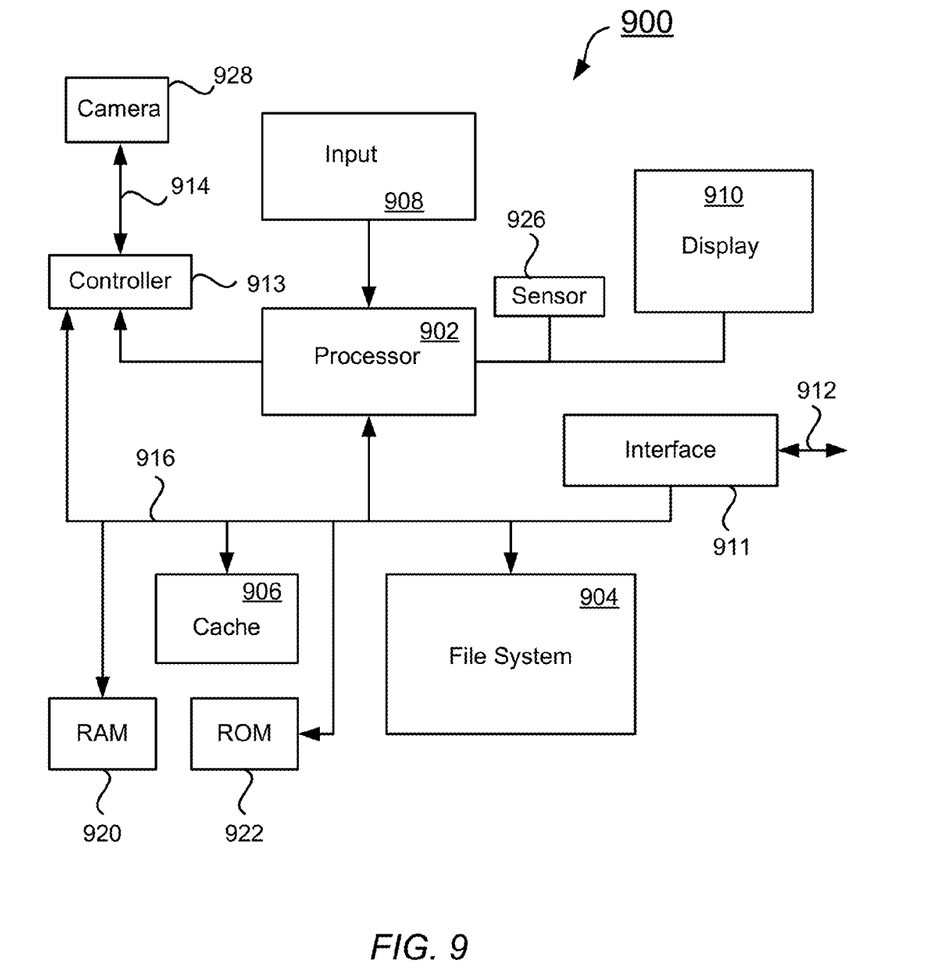
FIG. 9 is a block diagram of an electronic device suitable for implementing some of the described embodiments.

FIG. 9 is a block diagram of an electronic device suitable for controlling some of the processes in the described embodiments. Electronic device 900 can illustrate circuitry of a representative computing device. Electronic device 900 can include a processor 902 that pertains to a microprocessor or controller for controlling the overall operation of electronic device 900. Electronic device 900 can include instruction data pertaining to operating instructions, such as instructions for implementing and controlling a user equipment, in a file system 904 and a cache 906. File system 904 can be a storage disk or a plurality of disks. In some embodiments, file system 904 can be flash memory, semiconductor (solid state) memory or the like. The file system 904 can typically provide high capacity storage capability for the electronic device 900. However, since the access time for the file system 904 can be relatively slow (especially if file system 904 includes a mechanical disk drive), the electronic device 900 can also include cache 906. The cache 906 can include, for example, Random-Access Memory (RAM) provided by semiconductor memory. The relative access time to the cache 906 can be substantially shorter than for the file system 904. However, cache 906 may not have the large storage capacity of file system 904. The electronic device 900 can also include a RAM 920 and a Read-Only Memory (ROM) 922. The ROM 922 can store programs, utilities or processes to be executed in a non-volatile manner. The RAM 920 can provide volatile data storage, such as for cache 906.

Electronic device 900 can also include user input device 908 that allows a user of the electronic device 900 to interact with the electronic device 900. For example, user input device 908 can take a variety of forms, such as a button, keypad, dial, touch screen, audio input interface, visual/image capture input interface, input in the form of sensor data, etc. Still further, electronic device 900 can include a display 910 (screen display) that can be controlled by processor 902 to display information, such as test results, to the user. Data bus 916 can facilitate data transfer between at least file system 904, cache 906, processor 902, and input/output (I/O) controller 913. I/O controller 913 can be used to interface with and control different devices such as camera, spectrometer or motors to position mirror/lens through appropriate codecs. For example, control bus 914 can be used to control camera 928.

Electronic device 900 can also include a network/bus interface 911 that couples to data link 912. Data link 912 can allow electronic device 900 to couple to a host computer or to accessory devices or to other networks such as the internet. The data link 912 can be provided over a wired connection or a wireless connection. In the case of a wireless connection, network/bus interface 911 can include a wireless transceiver. Sensor 926 can take the form of circuitry for detecting any number of stimuli. For example, sensor 926 can include any number of sensors for monitoring a environmental conditions such as for example a light sensor such as a photometer, a temperature sensor and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium executable by a processor. The computer readable medium is any data storage device that can store data which can thereafter be read by a computer system. Examples of the computer readable medium include read-only memory, random-access memory, CD-ROMs, HDDs, SSDs (solid-state drives), DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for performing an optical test, the method comprising:
   by a spectra camera:
      receiving a sample of light to form an image;
      splitting the image into a first image and a second image;
      using a narrowband device to measure a first area of the first image to identify parametric data;
      using a broadband device to measure a second area of the second image to identify display artifacts, and
      concurrently calibrating, using the sample of light, the broadband device and the narrowband device based on measurements of the first area and the second area.

2. The method of claim 1, wherein splitting the image into the first image and the second image comprises using a mirror having an aperture, wherein the sample of light reflecting off the mirror forms the first image and light passing through the aperture forms the second image.

3. The method of claim 2, wherein the mirror comprises more than one aperture and each aperture is positioned to optimize measuring of the second area of the second image.

4. The method of claim 1, wherein measuring the first area on the first image to identify the parametric data is performed by: a Czerny-Turner spectrometer, a Lens-Grating-Lens (LGL) spectrometer, or a Mirror-Grating-Mirror (MGM) spectrometer.

5. The method of claim 1, further comprising:
when parametric data is identified, using the parametric data to calibrate the measuring of the second area on the second image to identify the display artifacts.

6. The method of claim 1, wherein splitting the image into the first image and the second image comprises using a beam splitter to split the image such that the first image is substantially identical to the second image.

7. A spectra camera configured to perform measurements to identify display artifacts and parametric data, the spectra camera comprising:
a splitter configured to split an image into a first image and a second image;
a broadband device configured to measure a first area of the first image to identify the display artifacts;
a first image pipeline configured to direct the first image to the broadband device, wherein the first pipeline is used to calibrate the broadband device;
a narrowband device configured to measure a second area of the second image to identify the parametric data; and
a second image pipeline configured to direct the second image to the narrowband device, wherein the second pipeline is used to concurrently calibrate the narrowband device with the broadband device.

8. The spectra camera of claim 7, wherein the splitter is an aperture mirror with an aperture in the middle such that light reflecting off the aperture mirror forms the first image and light passing through the aperture forms the second image.

9. The spectra camera of claim 7, wherein the splitter is a beam splitter.

10. The spectra camera of claim 7, wherein the narrowband device is a spectrometer.

11. The spectra camera of claim 10, wherein the broadband device is an imaging colorimeter.

12. The spectra camera of claim 11, wherein the spectrometer is used to calibrate the imaging colorimeter.

13. The spectra camera of claim 7, wherein the narrowband device is a high accuracy narrowband device configured to measure the second area, wherein the second area is a single spot of the second image.

14. The spectra camera of claim 7, wherein the broadband device is a low accuracy broadband device configured to measure the first area.

15. The spectra camera of claim 7, wherein the narrowband device is detachable from the spectra camera.

16. A non-transitory computer readable medium configured to store instructions that, when executed by a processor communicatively coupled to a spectra camera, cause the spectra camera to carry out steps that include:
receiving a sample of light to form an image;
splitting the image into a first image and a second image;
using a narrowband device to measure a first area of the first image to identify parametric data;
using, concurrently with the narrowband device, a broadband device to measure a second area of the second image to identify display artifacts; and
concurrently calibrating, using the sample of light, the broadband device and the narrowband device based on measurements of the first area and the second area.

17. The non-transitory computer readable storage medium of claim 16, wherein splitting the image into the first image and the second image comprises using a mirror having an aperture, wherein the sample of light reflecting off the mirror forms the first image and light passing through the aperture forms the second image.

18. The non-transitory computer readable storage medium of claim 16, wherein the simultaneous calibration comprises using measurements of the second area on the second image to compare with measurements of the first area on the first image.

19. The non-transitory computer readable storage medium of claim 18, wherein the simultaneous calibration comprises using tristimulus values of the narrowband device to calibrate tristimulus values of the broadband device.

20. The non-transitory computer readable storage medium of claim 19, wherein steps further include:
when the tristimulus values of the broadband device are not within a tolerance specification of the tristimulus values of the narrowband device:
recalibrating the broadband device.

* * * * *